(12) United States Patent
Tiesler et al.

(10) Patent No.: US 6,220,644 B1
(45) Date of Patent: Apr. 24, 2001

(54) VISOR ASSEMBLY

(75) Inventors: John M. Tiesler, Harrison Township; Ray Matusko, Richmond, both of MI (US)

(73) Assignee: Lear Automotive Dearborn, Inc., Southfield, MI (US)

( * ) Notice: Subject to any disclaimer, the term of this patent is extended or adjusted under 35 U.S.C. 154(b) by 0 days.

(21) Appl. No.: 09/266,140

(22) Filed: Mar. 10, 1999

(51) Int. Cl.$^7$ .................................................. B60J 3/00
(52) U.S. Cl. ................ 296/97.11; 296/97.9; 296/97.12
(58) Field of Search ...................... 296/97.11, 97.9, 296/97.12, 97.2, 97.5; 248/289.11

(56) References Cited

U.S. PATENT DOCUMENTS

| | | |
|---|---|---|
| 3,032,371 | 5/1962 | Berridge et al. . |
| 3,405,969 | 10/1968 | Creel . |
| 4,582,356 * | 4/1986 | Kaiser et al. .................. 296/97 K |
| 4,626,019 | 12/1986 | Tung et al. . |
| 4,925,233 | 5/1990 | Clark . |
| 4,998,765 * | 3/1991 | Van Order et al. ............... 296/97.11 |
| 5,004,288 * | 4/1991 | Viertel et al. .................. 296/97.11 |
| 5,026,108 * | 6/1991 | Leahy ............................. 296/97.11 |
| 5,161,850 * | 11/1992 | Redder et al. .................. 296/97.11 |
| 5,645,308 * | 7/1997 | Fink ................................ 296/97.9 |
| 5,765,899 * | 6/1998 | Watjer et al. ................... 296/97.11 |
| 5,871,252 * | 2/1999 | Gute ............................... 296/97.11 |
| 5,934,734 * | 8/1999 | Wilson ........................... 296/97.11 |
| 6,007,135 * | 12/1999 | Alves ............................. 296/97.9 |
| 6,010,174 * | 1/2000 | Murdock et al. ............... 296/97.11 |
| 6,010,175 * | 1/2000 | Bodar et al. ................... 296/97.11 |
| 6,024,399 * | 2/2000 | Viertel et al. .................. 296/97.11 |

FOREIGN PATENT DOCUMENTS

| | | |
|---|---|---|
| 33 24 305 A1 | 1/1985 | (DE) . |
| 0 231 440 A2 | 8/1987 | (EP) . |
| 0 340 195 A2 | 11/1989 | (EP) . |

* cited by examiner

*Primary Examiner*—Joseph D. Pape
*Assistant Examiner*—Mickki D. Murray
(74) *Attorney, Agent, or Firm*—MacMillan, Sobanski & Todd, LLC

(57) ABSTRACT

A vehicle visor assembly is mounted to a vehicle structure for pivotal, rotational, and sliding movement relative thereto and includes a single-piece visor blade and cartridge assembly. The single-piece visor blade includes a first mounting portion with a pair of grooves integrally formed along a top edge of the visor blade. The cartridge assembly includes a rod for attachment to the vehicle structure, a sleeve molded onto the rod, a detent supported on the sleeve, and a housing for mounting the rod and detent to the visor blade. The housing includes a second mounting portion with a pair of inwardly extending tongues that slidably engage the grooves on the first mount. An end cap is fastened to the visor blade to fix the housing to the blade. The visor can slide along the rod to a plurality of extended positions and the detent can hold the visor at any of various rotational positions relative to the vehicle structure.

19 Claims, 7 Drawing Sheets

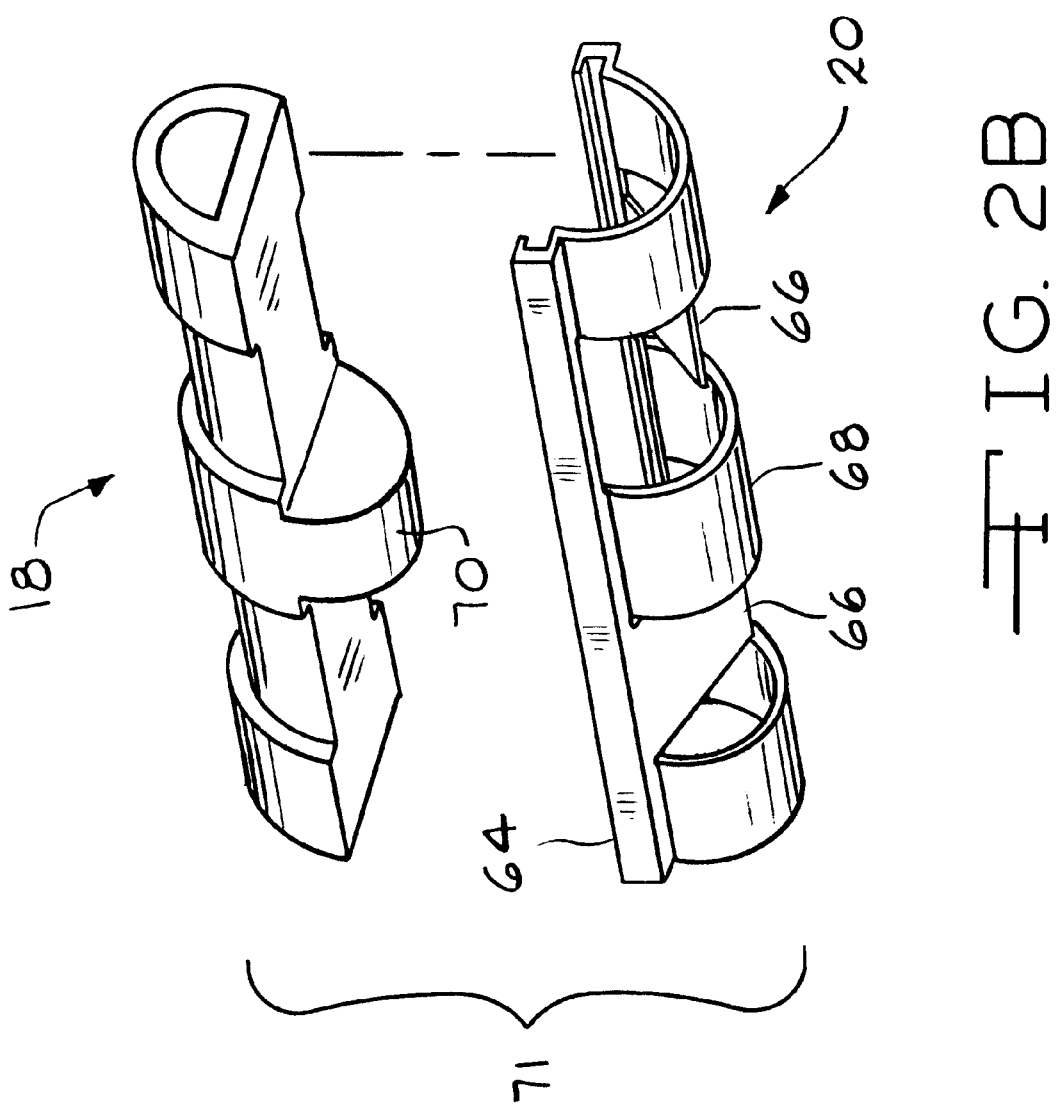

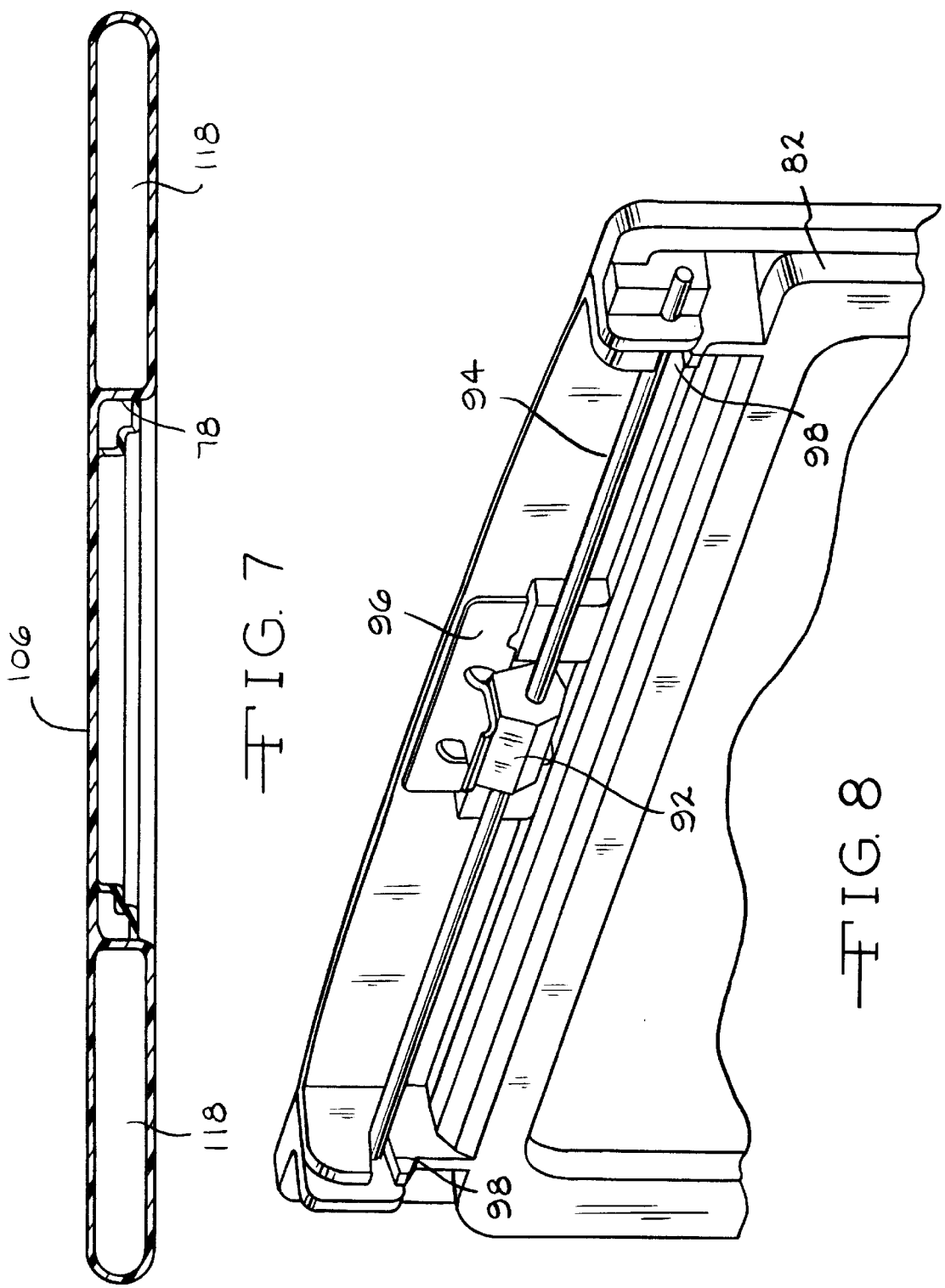

VISOR ASSEMBLY

BACKGROUND OF THE INVENTION

This application relates to a unique visor assembly that is secured to a vehicle structure such as a roof. Specifically, the visor assembly includes a single piece blade member and a cartridge assembly that easily mounts the blade to a pivot rod.

When driving a vehicle it is desirable to shield an occupant's eyes from glaring sunlight which enters the vehicle interior through the windshield or the side windows. As a result, the vehicle interiors usually are equipped with sun visors.

Visors typically include a visor body or blade and a pivot rod assembly. The pivot rod assembly includes a L-shaped pivot rod, a torque control and a means for mounting the rod to the vehicle roof and/or headliner. The torque control rotationally mounts the visor body to the pivot rod, and allows the visor body to be moved between, and held at, various rotational positions with respect to the rod. This allows the visor to be moved between a lowered position adjacent the windshield or side window to a raised position adjacent the roof and/or headliner.

Since the sun may enter the windshield or side window the rod mount should allow the visor to be pivoted between the windshield and the side window in the lowered position. The rod mount should also allow the visor blade to be slid along the rod to an longitudinally extended position. This allows for maximum visor adjustment to shield sunlight that may enter the windshield at an angle.

These multi-function visor assemblies are often complex, expensive and difficult to assemble. Therefore it is desirable to have a visor assembly that uses fewer components, has a visor blade that can be easily installed onto a pivot rod, and which is inexpensive.

SUMMARY OF THE INVENTION

A visor assembly includes a single piece rigid visor blade having a first mount integrally formed along an upper edge of the visor blade and a cartridge assembly having a second mount. The second mount engages the first mount to attach the visor blade to a vehicle structure. The cartridge assembly includes a rod, a sleeve in sliding engagement with the rod, a detent mounted on the sleeve, a bushing and a housing member. A lock member is used to fix the housing to the visor blade.

In a preferred embodiment, the sleeve has a centrally located tab and the detent has at least two cantilevered arms. The arms are located on either side of the tab such that the detent remains fixed relative to the blade as the rod slides along the sleeve. The sleeve allows the full visor assembly to slide along the rod to longitudinally adjust the position of the visor blade. The detent is used to hold the visor blade at any of various rotational locations with respect to the rod. The bushing is preferably mounted to one end of the rod for interacting with the blade as it rotates, pivots, and slides.

A preferred method of assembling the visor includes the steps of providing a visor blade with a first longitudinally extending locking member and a rod for mounting the visor blade to a vehicle structure. Mounting a bearing assembly on the rod for sliding movement relative to the rod. Installing the rod and bearing assembly in a housing to form a cartridge subassembly having a second longitudinally extending locking member. Interlocking the first and second locking members, and fixing the housing relative to the visor blade.

In a preferred embodiment, further steps include insert molding a sleeve on the rod and mounting a detent member on the sleeve to form the bearing assembly. A slit is provided along the sleeve during the molding process to prevent shrinkage of the sleeve onto the rod. A bushing is also preferably molded onto the rod and interacts with the first locking member as the blade pivots about the rod.

The subject invention offers several advantages over prior art systems because it provides visor assembly with a single piece visor blade that is easily installed on a rod assembly, and which is less expensive and requires fewer components than prior art designs.

These and other features of the present invention will be best understood from the following specification and drawings, the following of which is a brief description.

BRIEF DESCRIPTION OF THE DRAWINGS

FIG. 2B illustrates the assembly of the sleeve and detent shown in FIG. 1.

FIG. 7 is a cross-sectional view taken along line 7—7 as shown in FIG. 1.

FIG. 8 is a fragmentary perspective view of a bezel assembly for installing a mirror in the visor.

DETAILED DESCRIPTION OF THE PREFERRED EMBODIMENT

Figure 1:
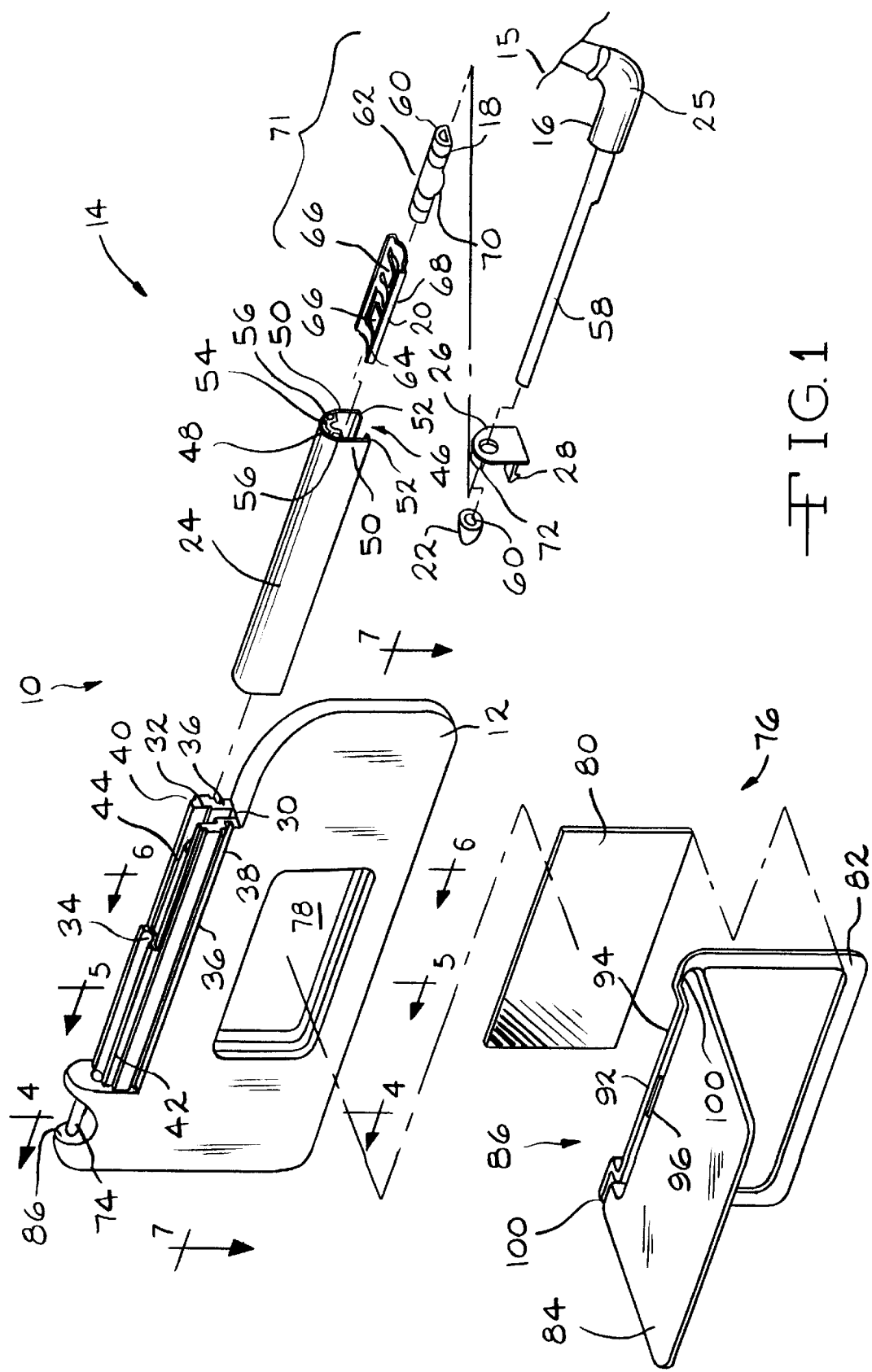
FIG. 1 is an exploded view of an visor assembly.
Figure 1A:
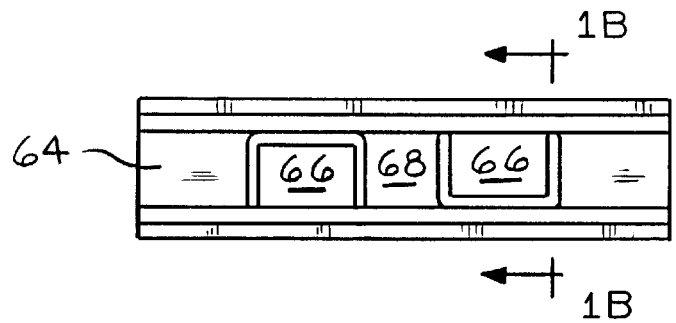
FIG. 1A is plan view of a detent shown in FIG. 1.
Figure 1B:
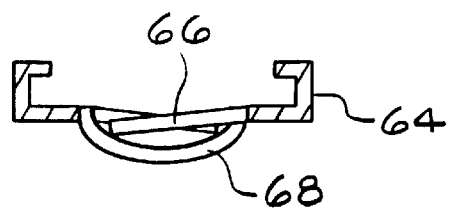
FIG. 1B is a cross-sectional view of the detent taken along line 1B—1B as shown in FIG. 1A.

Referring to FIG. 1, a visor assembly 10 for installation in a vehicle includes a visor main body or blade 12 and a cartridge assembly shown generally at 14. The cartridge assembly 14 is used to mount the visor blade 12 to a vehicle structure 15 such as a roof or pillar. The visor assembly 10 is used to shield an occupant's eyes from glaring sunlight that enters the vehicle interior through a windshield or a side window.

The visor blade 12 is preferably formed as a single piece from a plastic material, such as polypropylene, for example. The blade 12 is preferably molded as a single piece by using a gas assisted molding process that is known in the art. A mold for the blade 12 is partially filled with molten plastic and a gaseous bubble is introduced to the molten plastic causing the plastic to fill the mold while forming an interior hollow chamber. This will be discussed in greater detail below. The blade 12 can be covered by an upholstered surface to provide a trim appearance to the vehicle. While a plastic material is preferred, other materials known in the art could also be used.

The visor assembly 10 can rotated between a stored or raised position and a lower or shielding position. The visor 10 can also be pivoted to block the windshield or a side window. Additionally, the visor can be moved longitudinally along rod 16 to cover a further portion of the window. This will be described in greater detail below.

The cartridge assembly 14 includes a rod 16, a sleeve 18, a torque control or detent 20, a bushing 22, and a housing 24. The sleeve 18 is slidably mounted to the rod 16 and the detent or torque control 20 is supported on the sleeve 18. Thus as the rod 16 slides along the sleeve 18, the detent 20 is held in a fixed position relative to the visor blade 12.

The detent 20 is used to rotationally control rotational movement of the visor blade 12 relative to the rod 16 or other vehicle structure. The detent 20 allows the visor blade 12 to be moved between and held at various rotational positions with respect to the rod 16. This allows the visor blade 12 to be pivoted between a lowered position adjacent the windshield or side window to a raised position adjacent the roof.

The bushing 22 is mounted onto one end of the rod 16 and is bears against the blade 12 as the blade pivots about the rod 16. The rod 16, sleeve 18, detent 20, and bushing 22 are all installed within the housing 24. The housing 24 is then attached to the blade 12 to form a visor assembly 10. An end cap 26 and fastener 28 are used to fix the housing 24 to the blade 12. The blade 12 includes a bore 30 for receiving the fastener 28. The fastener 28 is preferably molded to the end cap 26.

The blade 12 includes a first mounting portion 32 that extends along an upper edge of the blade 12. The first mounting portion 32 is preferably integrally formed with the blade 12. The first mounting portion 32 includes a top surface 34 and a pair of longitudinally extending channels or grooves 36 that are located on sides 38, 40 of the first mounting potion 32. In the preferred embodiment, the grooves 36 extend along the sides 38, 40 of the blade 12 for a length that is at least as long as the top surface 34 of the first mounting portion 32.

The top surface 34 includes a first portion 42 and a second portion 44. The first portion 42 extends along for part of the length of the top surface 34 and supports the bushing 22. The tight fit between the bushing 22, as installed in the cartridge assembly 14, and the first portion 42 of the top surface 34 eliminates the blade 12 from wobbling on the rod 16. The second portion 44 extends along for part of the length of the top surface 34 and supports the detent 20. The first portion 42 is preferably curved to support the bushing 22 and the second portion 44 preferably includes a recessed flattened portion that allows the arms 66 of the detent to flex as the visor blade 12 is rotated between raised and lowered positions. While the second portion 44 is shown as flat in FIG. 6, the second portion could also have a slightly curved surface.

The housing 24 includes a second mounting portion 46 that interacts with the first mounting portion 32 to attach the blade 12 to the cartridge assembly 14, and thus, to the vehicle. The housing 24 is preferably a U-shaped member having a central curved portion 48 with a pair of downwardly extending legs 50. Each of the legs 50 includes a transversely extending tongue 52 that forms the second mounting portion 46. The tongues 52 are slidably inserted into the grooves 36 of the first mounting portion 32. The cartridge assembly 14 is slid along the blade 12 until the cartridge 14 hits a stop. The end cap 26 is then fastened into place to fix the housing 24 to the blade 12.

Spaced apart from the central curved portion 48, toward the center of the housing 24, is a half round portion 54. The rod 16 and bushing member 22 are slid into this half round portion 54. Two flanges 56 are used to hold the half round portion 54 apart from the central curved portion 48. The end cap 26 includes a tab 72 that is inserted between the flanges 56 when the housing 24 is fixed to the blade 12. While two flanges 56 are shown, it should be understood that more or less flanges 56 could be used.

Figure 2:
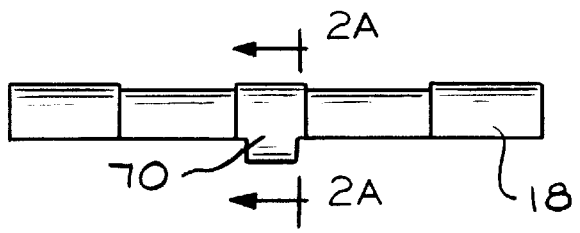
FIG. 2 is an elevation view of a sleeve shown in FIG. 1.
Figure 2A:
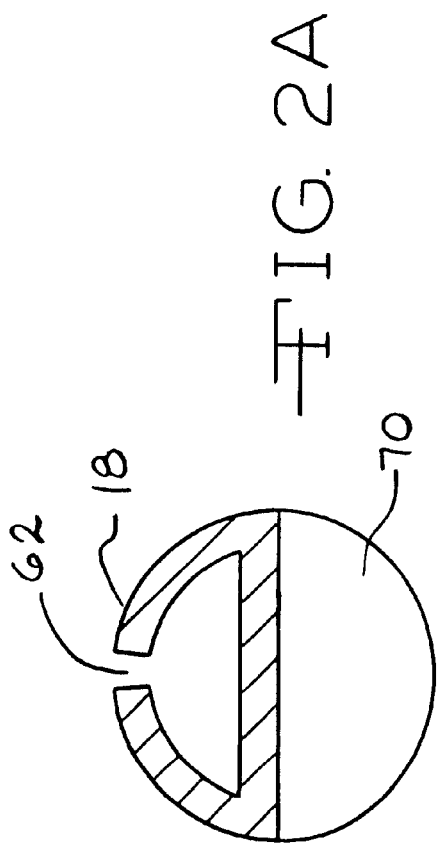
FIG. 2A is a cross-sectional view taken along line 2A—2A as shown in FIG. 2.

A portion of the rod 16 is preferably D-shaped 58, as shown in FIG. 1, to prevent rotation of the rod 16 in the housing 24. The sleeve 18 and the bushing 22 each include D-shaped openings 60. The sleeve 18 and bushing 22 are preferably insert molded onto the rod 16. The sleeve 18 includes a slit 62 along the top, shown more clearly in FIG. 2. The slit 62 cause the sleeve 18 to shrink away from the rod 16 during hardening so that the sleeve 18 can move relative to the rod 16.

The detent 20 includes a main body 64 and at least two (2) cantilevered arms 66. The arms 66 are spaced apart from one another by an intermediate 68 and are cantilevered from opposite edges of the main body 64. The sleeve 18 includes a holding portion 70. The holding portion 70 interacts with the arms 66 to hold the detent 20 longitudinally fixed with respect to the sleeve 18. In one embodiment, the holding portion 70 is a centrally located tab. When the detent 20 is mounted on the sleeve 18, the tab 70 is placed between the arms 66. This causes the detent 20 to remain fixed with respect to the visor blade 12 as the rod slides along the sleeve 18. Thus, the blade 12 can be longitudinally adjusted along the rod 16 to an extended position. The blade 12 can preferably be extended up to 120 millimeters, however the visor assembly 10 can be designed to accommodate longer or shorter extension lengths. The blade 12, housing 24, and end cap 26 are slid as a unit along the rod 16.

While a centrally located tab is shown, it should be understood that the sleeve 18 could include other types of holding portions 70. For example, tabs could be located on either end of the sleeve and placed near the outside edges of the arms 66, or depressions or recesses could be formed in the sleeve 18 to interact with the detent 20 to hold the detent to the sleeve 18.

The method of assembling the visor 10 includes the steps of providing a visor blade 12 with a first mount 32 and a rod 16 for mounting the visor blade 12 to a vehicle structure 15. A bearing assembly 71, which includes the sleeve 20 and the detent 20, is mounted on the rod 16 for sliding movement relative to the rod 16. The rod 16 and bearing assembly 71 are installed in a housing 24 to form a cartridge assembly 14 having a second mount 46. The first 32 and second 46 mounts are interlocked and the housing 24 is fixed relative to the visor blade 12.

Additional steps include forming the visor blade 12 as a single piece plastic member by using gas assisted injection molding and integrally forming the first mount 32 along an upper edge of the single piece plastic member. The sleeve member 18 is molded on the rod 16 and the detent member 20 is supported on the sleeve 18 to form the bearing assembly 71.

Figure 3:
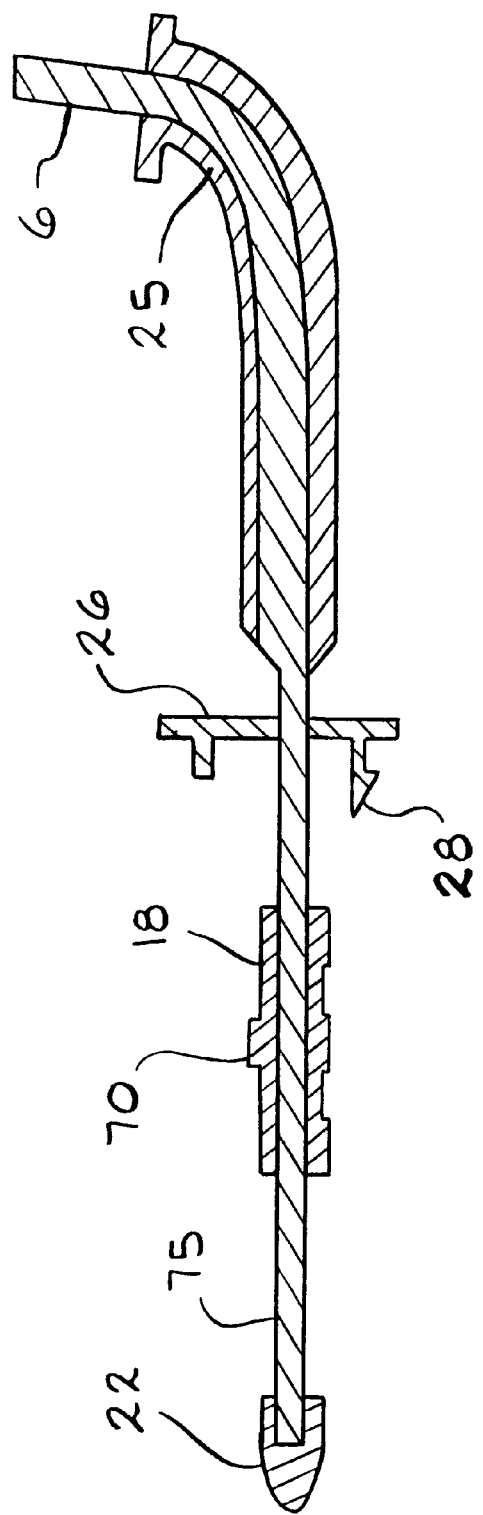
FIG. 3 is cross section view of the assembly rod assembly of FIG. 1.

During installation, the end cap 26 is preferably mounted as a loose piece, shown in FIG. 3, around the rod 16. The rod 16 and the bearing assembly 71 are inserted into the housing 24 to form the cartridge assembly 14. The blade 24 and cartridge assembly 14 are then slid together and the end cap 26 is fastened into place. A decorative elbow 25 is preferably molded onto the rod 16 to provide a trim appearance.

Figure 4:
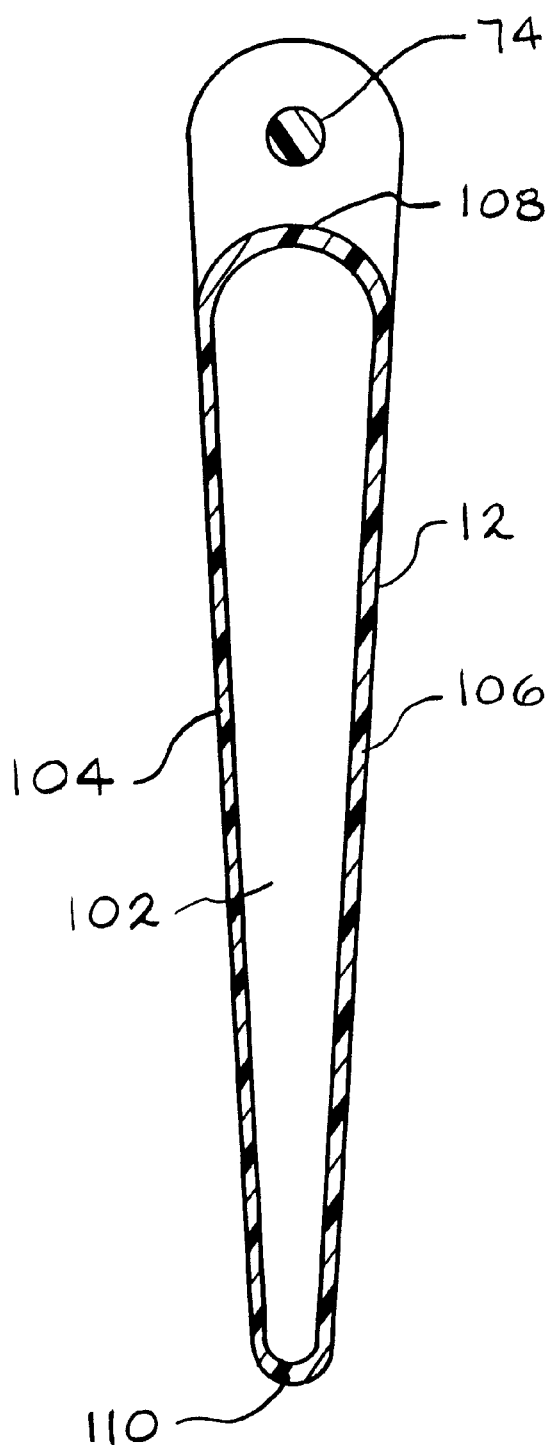
FIG. 4 is a cross-sectional view taken along line 4—4 as shown in FIG. 1.

In a preferred embodiment, the blade 12 includes a pin 74 that mounts to the vehicle structure at a position spaced from the rod 16 and cartridge 14 mount. This provides a secondary attachment of the visor 10 to the roof. The pin 74 extends across a cut-out 86 that allows the pin 74 to be selectively detached from the vehicle structure so that the blade 12 can be pivoted to cover a side window. In the preferred embodiment, the pin 74 is integrally molded into the blade 12. A cross-sectional view of the blade 12 and pin 74 is shown in FIG. 4.

Figure 5:
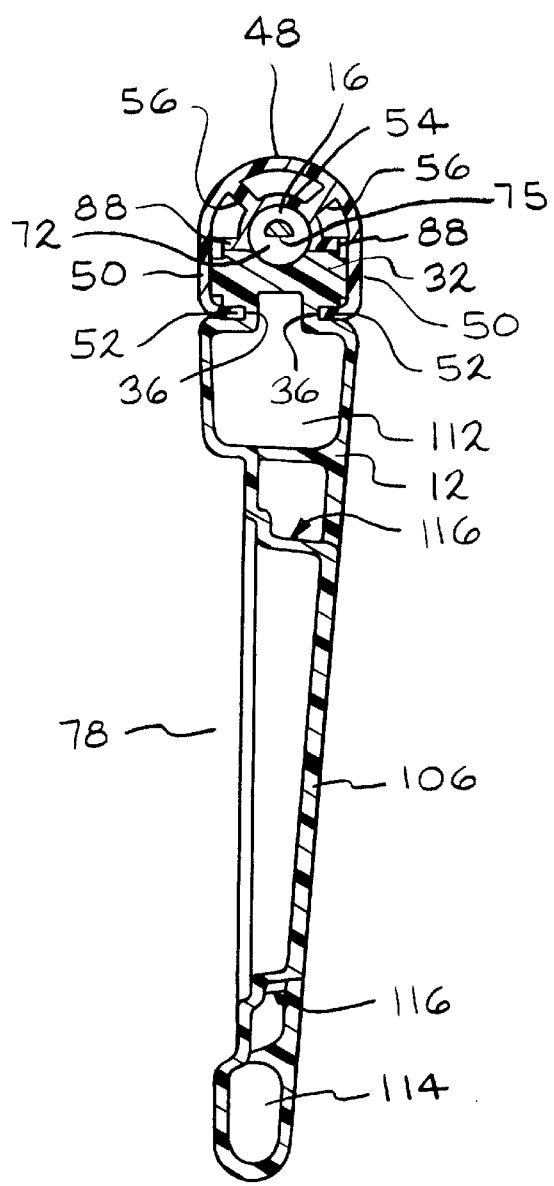
FIG. 5 is a cross-sectional view taken along line 5—5 as shown in FIG. 1.

FIG. 5 shows a cross sectional view of the housing 24 at the first portion 42 of the first mount 32. The rod 16 is slidably received in the half round 54 of the housing 24. A pair of ledges 88 extend transversely from the half round 54 to engage the top surface 34 of the first mount 32. The tongues 52 are inserted into the grooves 36 to prevent the cartridge assembly 14 from separating from the blade 12. The fit between the tongues 52 and grooves 36 is preferably a tight interference fit to reduce vibrations.

Figure 6:
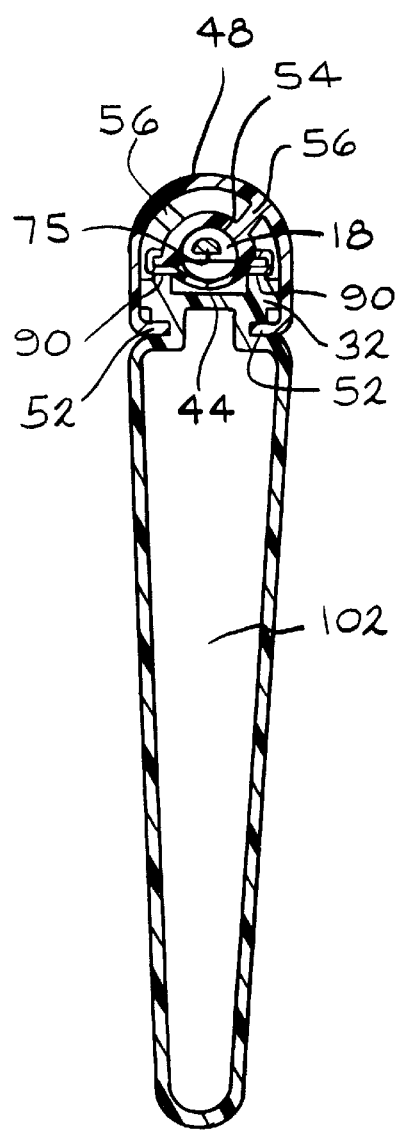
FIG. 6 is a cross-sectional view taken along line 6—6 as shown in FIG. 1.

FIG. 6 shows a cross sectional view of the housing 24 at the second portion 44 of the first mount 32. The rod 16 is slidably received in the half round 54 and the detent 20 is supported along the top surface 34 of the first mount 24. The arms 66 extend toward the flat portion 44 and flex as the blade 12 pivots about the rod 16. A pair of ribs 90 prevent the detent 20 from rotating on the rod 16. As shown in the figures, the rod 16 includes a flattened surface 75. The arms 66 cooperate with the edges of the flattened surface 75 of the rod 16 to frictionally retain the blade 12 in its pivoted position.

Also in a preferred embodiment, the visor 10 includes a mirror assembly 76 that is installed into a pocket or depression 78 in the blade 12, shown in FIG. 7. The mirror assembly includes a mirror 80, a bezel 82, a lid 84, and a mounting assembly 86 for pivotally attaching the lid 84 to the bezel 82. While a mirror assembly 76 is preferred, the visor 10 does not require one.

The mirror 80 is placed within the pocket 78 and the bezel is preferably sonic welded around the mirror 80 to hold the mirror 80 in place. The lid 84 is then pivotally attached to the bezel 82 to cover the mirror 80.

The bezel 82 and mounting assembly 86 is shown in greater detail in FIG. 8. The mounting assembly 86 includes a cam 92, a rod 94, and a spring 96. The rod 94 is installed in slots 98 located at each side of the bezel 82. The cam 92 is centrally mounted on the rod 16 and coacts with the spring 96 to pivot the lid 84 between open and closed positions. The rod 94 and cam 92 are molded together and the cam moves in unison with the lid 84. The lid 84 has slots 100 at either side that slide over the rod 94. With installed the mirror assembly 76 is flush with the blade 12.

As discussed above, a gas assist molding process is used to form the blade 12. When a gas, such as nitrogen, is injected into the molten plastic a chamber 102 is formed within the blade 12. As shown in FIG. 4 the chamber 102 is defined by at least two walls. In the preferred embodiment, the chamber 102 is formed by a first wall 104, a second wall 106, an upper edge 108, and a lower edge 110. When the visor 10 does not include a mirror assembly 76, the a single chamber 102 is formed within the blade 12.

When the blade 12 is molded to receive a mirror assembly 76 an upper chamber 112 and a lower chamber 114 are created, as shown in FIG. 5. The bottom or back face of the pocket 78 is thus actually formed out of the second wall 106 or back wall of the blade 12. Side 118 chambers are also formed in this configuration. Mounts 116 are installed within the pocket 78 to assist in attachment of the bezel 82.

While a particular invention has been described with reference to the illustrated embodiment, various modifications of the illustrative embodiment will be apparent to persons skilled in the art upon reference to this description without departing from the spirit and scope of the invention. These modifications include, but are not limited to, modifying the shape of the blade 12, modifying the shape of the housing 14, or using a different style of detent. Furthermore, the positions of the tongues and grooves 36 could be reversed such that the grooves 36 are in the cartridge assembly 14 and the tongues are on the blade 12. It is therefore contemplated that the appended claims will cover any such modification or embodiments that fall within the true scope of the invention Preferred embodiments of this invention have been disclosed, however, a worker of ordinary skill in the art would recognize that certain modifications would come within the scope of this invention. For that reason, the following claims should be studied to determine the true scope and content of this invention.

What is claimed is:

1. A visor assembly comprising:
    a visor blade having a first interlocking portion, said fist interlocking portion including a first pair of track members located on opposite sides of said visor blade;
    a rod for mounting said blade to a vehicle structure;
    a bearing assembly slidably mounted to said rod for movement relative to said rod;
    a housing member having a second interlocking portion, said second interlocking portion including a second pair of track members located on opposite sides of said housing member, said second pair of track members slidingly engaging said first pair of track members of said visor blade to mount said rod and bearing assembly to said blade; and
    a lock member for fixing said housing to said blade.

2. An assembly as set forth in claim 1 wherein said visor blade is a plastic member integrally formed as one piece, said visor blade having said first interlocking portion formed along an edge thereof.

3. An assembly as set forth in claim 1 wherein said bearing assembly is comprised of a sleeve slidably mounted on said rod and a detent supported on said sleeve.

4. An assembly as set forth in claim 3 wherein said housing includes at least one inwardly extending tongue and an inner curved bearing surface for slidably receiving said rod.

5. An assembly as set forth in claim 4 wherein said first interlocking portion includes at least one longitudinally extending channel for receiving said tongue, a first support surface extending along a first pre-determined length of said first interlocking portion, and a second support surface extending along a second predetermined length of said first interlocking portion, said first support surface for supporting said detent and said second support surface for supporting a bushing.

6. An assembly as set forth in claim 3 wherein said detent member includes at least two cantilevered flexing arms and said sleeve includes a centrally located tab, said flexing arms being located on either side of said tab causing said detent to be fixed relative to said blade as said rod slides along said sleeve.

7. An assembly as set forth in claim 1 wherein said visor blade is integrally formed as a one piece member defined by a first wall, a second wall spaced apart from said first wall, a first edge interconnecting said first and second walls, and a second edge opposite from said first edge, said second edge interconnecting said first and second walls to form a chamber therebetween.

8. An assembly as set forth in claim 7 including a centrally located pocket for receiving a mirror assembly, said pocket having a bottom formed by one of said walls such that upper and lower chambers are formed between said first and second walls above and below said pocket.

9. An assembly as set forth in claim 8 wherein said mirror assembly includes a mirror, a bezel for mounting said mirror within said pocket, and a lid pivotally attached at either end to said bezel with a pivot rod.

10. An assembly as set forth in claim 9 including a cam mounted to said pivot rod and coacting with a spring to pivot said lid between open and closed positions.

11. A method of assembling a visor comprising the steps of:
    (a) providing a visor blade with a first longitudinally extending locking member and a rod for mounting the visor blade to a vehicle structure;
    (b) mounting a bearing assembly on the rod for sliding movement relative to the rod;
    (c) installing the rod and bearing assembly in a housing to form a cartridge subassembly having a second longitudinally extending locking member;
    (d) interlocking the first and second locking members; and
    (e) fixing the housing relative to the visor blade.

12. A method as set forth in claim 11 further including the step of forming the visor blade as a single piece plastic member by using gas assisted injection molding prior to step (a).

13. A method as set forth in claim 12 further including the step of integrally forming the first locking member along an upper edge of the single piece plastic member.

14. A method as set forth in claim 11 including the steps of insert molding a sleeve member on the rod and mounting a detent member on the sleeve to form the bearing assembly prior to step (b).

15. A method as set forth in claim 14 including the step of providing a slit along the sleeve during the insert molding process.

16. A method as set forth in claim 14 including the step of insert molding a bushing on one end of the rod.

17. A visor assembly comprising:
    a single piece rigid visor blade having a first mount integrally formed along an upper edge of said visor blade; and
    a cartridge assembly having a second mount engaging said first mount to mount said visor blade to a vehicle structure, said cartridge assembly comprising
        a rod,
        a sleeve in sliding engagement with said rod and having at least one holding portion,
        a detent mounted on said sleeve and having at least two cantilevered arms located interacting with said holding portion such that the longitudinal position of said detent remains fixed with respect to said blade as said rod slides along said sleeve,
        a bushing mounted to one end of said rod for interacting with said blade,
        a housing member for supporting said rod and detent and including said second mount, and
        a lock member for fixing said housing to said blade.

18. An assembly as set forth in claim 17 wherein said first mount includes a top surface having a first portion for supporting said bushing extending partially along said upper edge for a first length and a second portion for supporting said detent extending partially along said upper edge for a second length, and a pair of longitudinal grooves extending along said upper edge by at least a distance defined by the summation of said first and second lengths.

19. An assembly as set forth in claim 18 wherein said housing is comprised of a main body having a central half round portion with two inwardly extending tongues, said half round portion for engaging said rod and said tongues for slidably engaging said grooves.

* * * * *